United States Patent
D'Angelo et al.

(10) Patent No.: US 7,757,943 B2
(45) Date of Patent: Jul. 20, 2010

(54) COMBINED PAYMENT/ACCESS-CONTROL INSTRUMENT

(75) Inventors: Frank D'Angelo, Mequon, WI (US); Jimmie Lindsey, Milwaukee, WI (US)

(73) Assignee: Metavante Corporation, Milwaukee, WI (US)

(*) Notice: Subject to any disclaimer, the term of this patent is extended or adjusted under 35 U.S.C. 154(b) by 0 days.

(21) Appl. No.: 11/468,169

(22) Filed: Aug. 29, 2006

(65) Prior Publication Data

US 2008/0054065 A1 Mar. 6, 2008

(51) Int. Cl.
*G06K 5/00* (2006.01)

(52) U.S. Cl. ............................ 235/382; 235/380

(58) Field of Classification Search ......... 235/380–382; 705/1–64

See application file for complete search history.

(56) References Cited

U.S. PATENT DOCUMENTS

| | | | | |
|---|---|---|---|---|
| 5,614,703 A * | 3/1997 | Martin et al. | ............... | 235/382 |
| 5,828,044 A * | 10/1998 | Jun et al. | ............... | 235/380 |
| 6,345,263 B1 * | 2/2002 | Matsumoto et al. | ............... | 705/41 |
| 6,470,451 B1 * | 10/2002 | Weinstein | ............... | 713/185 |
| 6,505,772 B1 * | 1/2003 | Mollett et al. | ............... | 235/379 |
| 6,776,332 B2 * | 8/2004 | Allen et al. | ............... | 235/380 |
| 6,873,260 B2 * | 3/2005 | Lancos et al. | ............... | 340/573.1 |
| 7,003,501 B2 * | 2/2006 | Ostroff | ............... | 705/76 |
| 7,246,740 B2 * | 7/2007 | Swift et al. | ............... | 235/382 |
| 2001/0018660 A1 * | 8/2001 | Sehr | ............... | 705/41 |
| 2003/0028787 A1 * | 2/2003 | Fayed et al. | ............... | 713/189 |
| 2003/0135406 A1 | 7/2003 | Rowe | | |
| 2004/0068472 A1 | 4/2004 | Sahota et al. | | |
| 2004/0236701 A1 | 11/2004 | Beenau et al. | | |
| 2004/0254813 A1 | 12/2004 | Messer | | |
| 2005/0027655 A1 | 2/2005 | Sharma et al. | | |
| 2005/0124408 A1 | 6/2005 | Vlazny et al. | | |
| 2005/0234769 A1 | 10/2005 | Jain et al. | | |
| 2005/0234778 A1 * | 10/2005 | Sperduti et al. | ............... | 705/22 |
| 2006/0085297 A1 | 4/2006 | Minerley | | |
| 2006/0149580 A1 | 7/2006 | Helsper et al. | | |
| 2006/0149674 A1 * | 7/2006 | Cook et al. | ............... | 705/44 |
| 2006/0174130 A1 | 8/2006 | Noble | | |
| 2007/0061259 A1 * | 3/2007 | Zoldi et al. | ............... | 705/44 |
| 2007/0102511 A1 * | 5/2007 | Park | ............... | 235/382 |
| 2007/0192249 A1 * | 8/2007 | Biffle et al. | ............... | 705/44 |
| 2007/0272744 A1 * | 11/2007 | Bantwal et al. | ............... | 235/382 |

FOREIGN PATENT DOCUMENTS

| | | |
|---|---|---|
| EP | 001265186 A3 | 12/2003 |
| JP | 2005-166047 A | 6/2005 |
| KR | 2004-072750 | 9/2004 |
| WO | 2005-071596 A2 | 8/2005 |

* cited by examiner

*Primary Examiner*—Seung H Lee
*Assistant Examiner*—Christle I Marshall
(74) *Attorney, Agent, or Firm*—Townsend and Townsend and Crew LLP

(57) ABSTRACT

Methods and systems permit monitoring behavior of a holder of a multifunction presentation instrument that is suitable for presentation by the holder in support of payment transactions and access transactions. A payment transaction involves a purchase by the holder using funds identified by the multifunction presentation instrument. An access transaction involves an authorization for the holder to enter a restricted area. A first communication received at a host system has transaction details of an attempted payment transaction initiated by the holder, and a second communication received at the host system has transaction details of an attempted access transaction initiated by the holder. These transaction details are stored in a data store and analyzed to identify potentially suspicious behavior by the holder.

32 Claims, 6 Drawing Sheets

COMBINED PAYMENT/ACCESS-CONTROL INSTRUMENT

BACKGROUND OF THE INVENTION

This application relates generally to payment and access-control instruments. More specifically, this application relates to instruments that combine payment and access control.

In recent years, the number of instruments that are carried by individuals have proliferated significantly. It is not uncommon for an individual to carry multiple payment instruments in the form of credit cards, debit cards, stored-value cards, and the like, to carry multiple identification cards in the form of a driver's license, a library card, and the like; and to carry multiple access-control cards in the form of an office-building access card, a healthclub access card, and the like. The number of instruments and the variety of functionalities that they have represent a source of inconvenience for many holders of these instruments. There is a general need recognized in the art to simplify the manner in which the functionality of different instruments is implemented to mitigate this proliferation.

At the same time, there has been an increased emphasis throughout the world on security issues. Part of this emphasis has been driven by a number of highly visible terrorist attacks that have taken place in Asia, Europe, and North America. But more generally, there is an increased awareness that a variety of institutional facilities and infrastructure components are vulnerable to interference by hostile parties, whatever their motivations. This vulnerability is due at least in part to an increase in the sophistication of methods being used by hostile parties, who have recently demonstrated an increased ability to execute schemes requiring coordination among multiple individuals in different locations. A need to anticipate potential attacks by these kinds of parties is also recognized in the art.

BRIEF SUMMARY OF THE INVENTION

Embodiments of the invention provide methods and systems that simultaneously address these disparate needs. Such methods and systems make use of an integrated instrument that combines at least the functionalities of acting as a payment instrument and acting as an access-control instrument. The combined functionality of the integrated instrument not only consolidates the functionality of different instruments and reduces the inconvenience associated with multiple instruments, but enables certain types of transactions that are not readily performed with separate instruments. The integrated instrument also provides a mechanism by which disparate types of information may be collected for monitoring purposes to evaluate the risk that the holder of the instrument is engaged in illegal activity or preparing to engage in illegal activity. In some cases, these disparate pieces of information may be correlated with other types of information derived independently from intelligence sources and providers of information regarding the institutions or infrastructure components that may be at risk.

In particular embodiments, methods are provided of monitoring behavior of a holder of a multifunction presentation instrument that is suitable for presentation by the holder in support of payment transactions and access transactions. A payment transaction comprises a purchase by the holder using funds identified by the multifunction presentation instrument. An access transaction comprises an authorization for the holder to enter a restricted area. In implementing the methods, a first communication is received at a host system. The first communication comprises transaction details of an attempted payment transaction initiated by the holder. A second communication is received at the host system. The second communication comprises transaction details of an attempted access transaction initiated by the holder. The transaction details of the attempted payment transaction and the transaction details of the attempted access transaction are stored in a data store. An analysis of data is performed to identify potentially suspicious behavior by the holder. The data comprise the transaction details of the attempted payment transaction and the transaction details of the attempted access transaction.

In some of these methods, the first communication includes an indication that the attempted payment transaction was executed by providing funds to support a purchase by the holder. In others of the methods, the first communication includes an indication that the attempted payment transaction was denied. Similarly, sometimes the second communication includes an indication that the attempted access transaction was authorized by granting authorization to the holder to enter a restricted area, while in other instances, the second communication includes an indication that the attempted access transaction was denied.

In certain embodiments, the attempted payment transaction comprises a purchase by the holder for access to a particular restricted area, with the attempted access transaction comprising an authorization for the holder to enter the particular restricted area.

There are a variety of different types of payment transactions that may be accommodated in different embodiments. For instance, in some embodiments, a third communication is received by the host system, with the third communication comprising transaction details of a second attempted payment transaction initiated by the holder. The first communication may specify a type of the attempted payment transaction and the third communication may specify a second type of the second attempted payment transaction different from the type of the attempted payment transaction. The type of the attempted payment transaction and the second type of the second attempted payment transaction are each selected from the group consisting of a credit transaction, a debit transaction, and a stored-value transaction.

Different types of analyses may also be performed in identifying potentially suspicious behavior by the holder. For example, in some instances, transaction details of past payment transactions and/or access transactions attempted by the holder are retrieved from the data store. The transaction details of the attempted payment transaction and attempted access transaction are then analyzed in combination with the transaction details of the past payment transactions and/or access transactions to identify the potentially suspicious behavior by the holder.

In other instances, transaction details of payment transactions and/or access transactions attempted by a second holder of a second multifunction presentation instrument are retrieved from the data store. The second holder is different from the holder and the second multifunction presentation instrument is different from the multifunction presentation instrument. The transaction details of the attempted payment transaction and attempted access transaction are then analyzed in combination with the transaction details of the payment transactions and/or access transactions attempted by the second holder to identify the potentially suspicious behavior by the holder.

In still other instances, nontransaction information is received. This permits the transaction details of the attempted payment transaction and attempted access transaction to be analyzed in combination with the nontransaction information to identify the potentially suspicious behavior by the holder.

There are a number ways in which the different attempted transactions may be initiated. For example, in one embodiment, the funds identified by the multifunction presentation instrument are maintained in an account by a financial institution and the attempted payment transaction comprises a request for approval of the attempted payment transaction from the financial institution. In such an embodiment, the attempted payment transaction may sometimes be initiated by the holder through an exchange of radio-frequency electromagnetic signals with the multifunction presentation instrument. Similarly, the attempted access transaction may sometimes be initiated by the holder through an exchange of radio-frequency electromagnetic signals with the multifunction presentation instrument. In certain embodiments, the transaction details of the attempted payment transaction comprise an identification number unique to the holder, and the transaction details of the attempted access transaction also comprise the identification number.

In some embodiments, a response to the potentially suspicious behavior by the holder is initiated.

The methods of the present invention may be embodied in a system having a communications device, a processor, a storage device, and a memory coupled with the processor. The memory comprises a computer-readable medium having a computer-readable program embodied therein for directing operation of the system in accordance with the various embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1A:
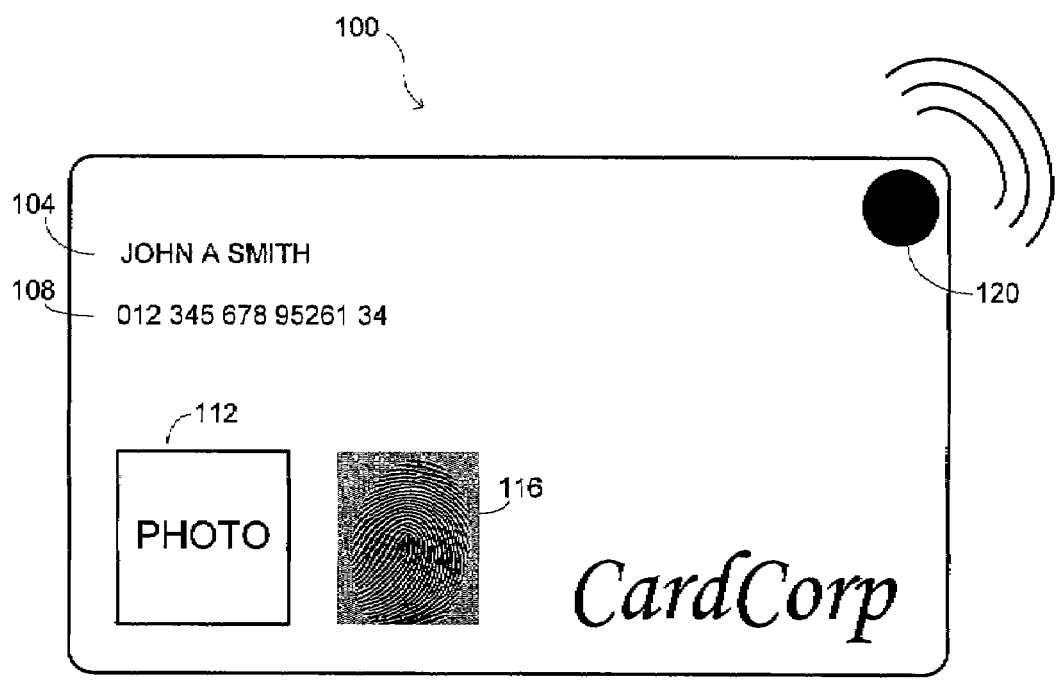
FIGS. 1A and 1B show opposite sides of a combined payment and access-control instrument configured as a card having an embedded radio-frequency identification ("RFID") chip.

Embodiments of the invention make use of a multifunction instrument that can be used at least as a financial payment instrument and as an access-control instrument. In some embodiments, additional functionality may be provided with the instrument beyond the financial payment and access-control functions. As used herein, references to "payment" functionality is intended to be construed broadly as referring to any functionality that permits an individual to provide financial support to a transaction executed by the individual. Examples of payment functionality thus include credit functions in which the individual is extended credit to support a financial transaction, using the multifunction instrument to identify himself as entitled to such credit. Payment functionality also includes debit functionality in which the individual uses the multifunction instrument to identify an account from which funds may be drawn directly in supporting a financial transaction. Such similarity is similar in some respects to stored-value functionality, in which the instrument identifies a stored-value account from which funds may be drawn to support a financial transaction.

References to "debit" functions and "stored-value" functions differ, however, in the specific character of the supporting account. A "debit" function is performed against a demand-deposit account such as a savings or checking account maintained by a financial institution on behalf of the individual. A "stored-value" function is performed against an account having earmarked funds; stored-value accounts may have additional restrictions associated with them that are not imposed on demand-deposit accounts. For instance, a stored-value account may be restricted in that additional funds may not be deposited to the account. Or, in instances where deposits are permitted, there may be a maximum balance that the account is permitted to reach. Other restrictions may include restrictions on the nature of the transaction that is to be supported with the stored-value account, with some stored-value accounts including restrictions on the type of goods or services that may be purchased or including restrictions on the identity of a merchant with whom the transaction is executed.

References to "access control" are similarly intended to be construed broadly. They include any instance where some limitation is imposed on admissibility of persons into some area. Authorization of a person to enter a controlled area may be established on a temporary basis or on a more permanent basis. For instance, permanent employees of a business may be granted access to an office or other work side in accordance with conditions of their employment on a permanent basis. But access by healthclub members who make monthly membership payments to a healthclub might be authorized to have access to healthclub facilities on a temporary monthly basis that is extended with receipt by the healthclub of each payment. This is one of several examples in which access by a person to a restricted area in conditioned on payment of a fee by the person. Other examples include circumstances in which a single access is associated with each payment, such as where access might be provided to a sporting arena, cinema, art gallery, or the like upon payment of an entrance fee by a patron. Other examples of areas that may have access restricted on a temporary or permanent basis include student dormitories, parking lots and garages, airport concourses, and the like. Numerous other examples of areas that have restricted access will be evident to those of skill in the art.

Figure 1B:
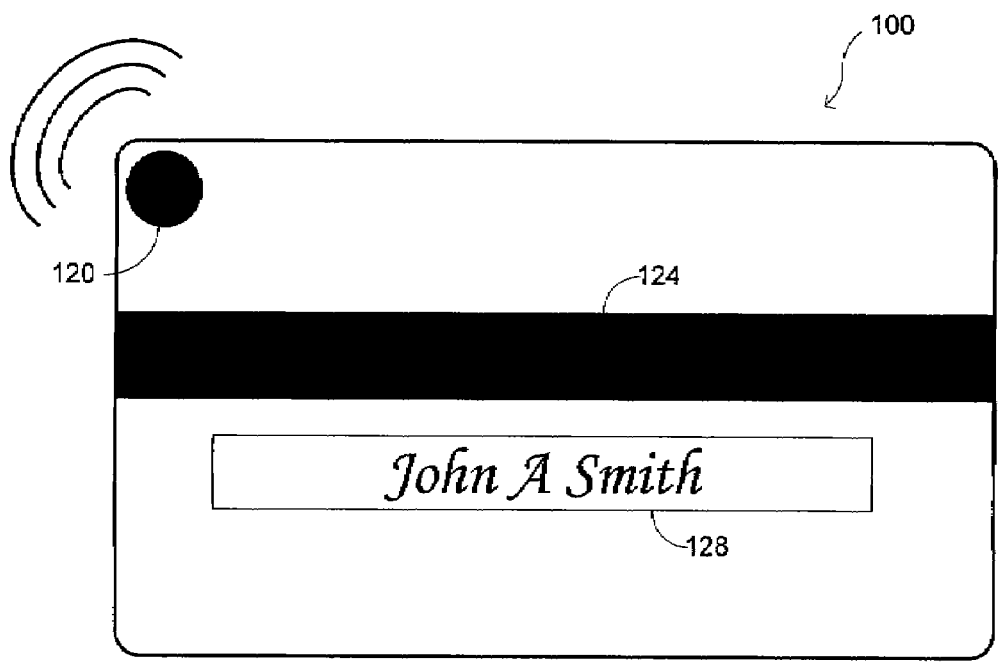

The multifunction instrument that is to enable both payment and access-control functionality may take a variety of different forms in different embodiments. Examples of more popular forms include plastic cards, key fobs, passports, and automobile transponders, but the invention is not limited by the specific form taken by the instrument. FIGS. 1A and 1B provide an illustration of the front and back sides of a multifunction instrument in an embodiment where it takes the form of a plastic card. In this embodiment, the card 100 comprises an RFID chip 120 which enables electromagnetic signals to be exchanged with the multifunction instrument in implementations of the different functionalities supported by the instrument. The RFID chip 120 may be a passive chip or an active chip in different embodiments. As is well known to those of skill in the art, the status of bits may managed by electromagnetic interactions with the RFID chip 120. Implementations of the invention correlate this bit status with an authority to access a particular source of funds in supporting a payment transaction and/or with an authorization to enter a restricted area.

The card 100 shown in FIGS. 1A and 1B may sometimes include additional conventional media for storing information related to the payment authority and/or access authorizations. FIG. 1B shows an embodiment in which this information is stored on a magnetic stripe 124 affixed to the back of the card 100, although a variety of other media, including magnetic, optical, and various forms of electronic media may be used in alternative embodiments.

Information may also be printed directly onto the instrument. This is particularly useful in instances where the device is to be used for identification purposes. For example, the card-based implementation shown in FIGS. 1A and 1B is well suited to including a photograph 112 of the proper instrument holder and perhaps a fingerprint 116. Other types of identifying information that may be printed on the instrument or stored in a storage medium on the instrument include retinal scans, hand-geometry or facial-geometry eigenvalues, or other biometric forms of identification.

The instrument will often include the name 104 of the instrument holder in some form, and may include a place 128 for the instrument holder to sign the instrument. In such cases, the signature may act as an addition mechanism for confirming the identity of the instrument holder.

According to embodiments of the invention, each instrument includes an identification number 108 that is associated with the authorized instrument holder. This may differ from some conventional implementations of credit cards and debit cards, in which numbers on such cards identify financial account numbers and may be included on multiple instruments when access to the financial accounts is authorized to multiple individuals. This is common, for instance, when credit cards are issued to multiple family members or debit cards are issued to holders of joint accounts. While stored-value cards tend to use unique identification numbers, these numbers are associated with a corresponding stored-value account. This is usually done irrespective of the identity of the cardholder since such cards are frequently intended to be freely transferred to others in the form of gift cards. Instead, the identification number 108 number used in embodiments of the invention is in a one-to-one correspondence with the identity of the instrument holder. While references are sometimes made to an identification "number," such references are not intended to require that the identification number consist of a numerical string. Indeed, in a variety of embodiments, alphabetic characters are included in the identification number. In other embodiments, the identification number comprises a sequence of electromagnetic frequencies that lack any direct correspondence to alphanumeric characters.

Figure 2:
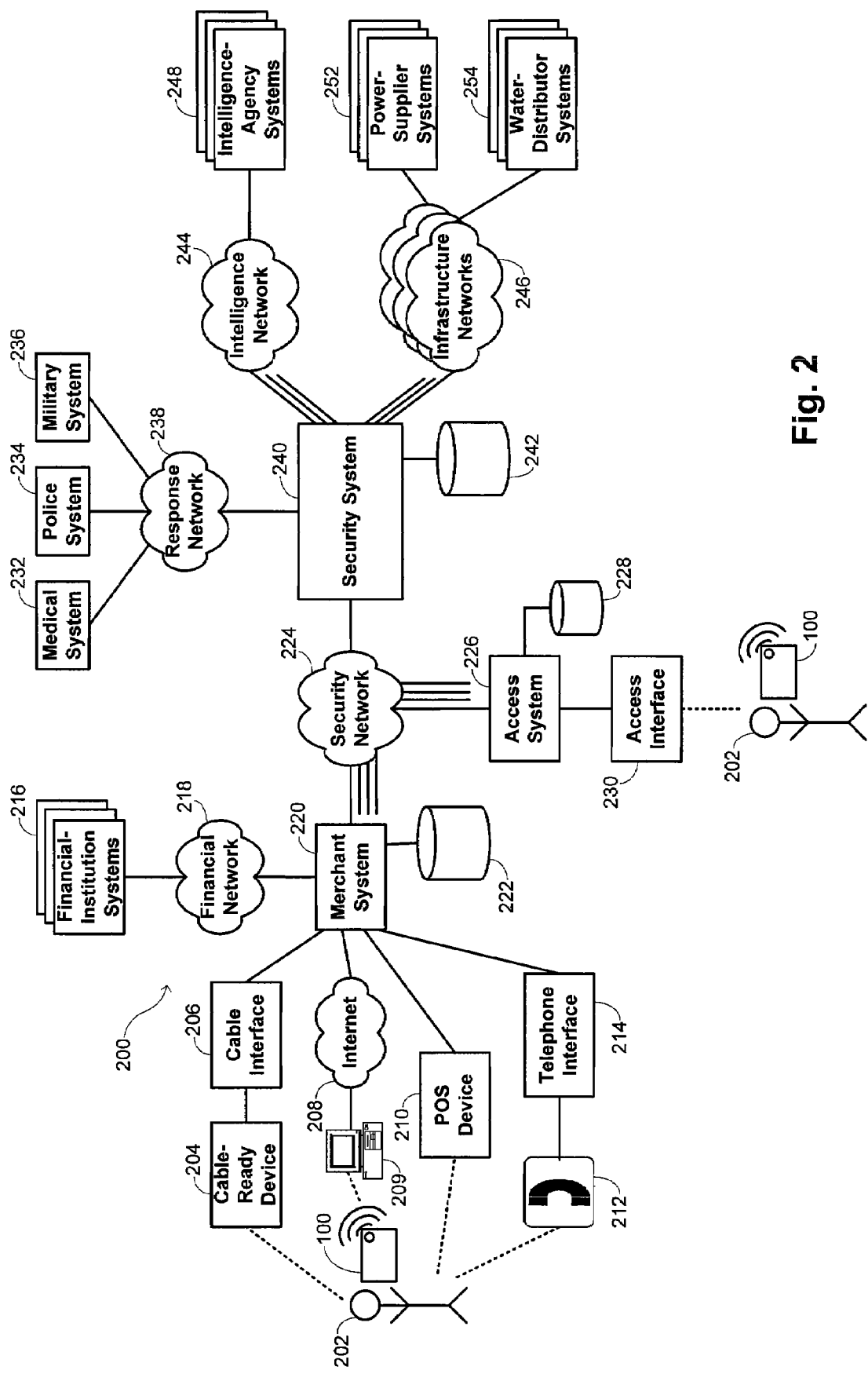
FIG. 2 is a schematic illustration of an architecture within which embodiments of the invention may be implemented.

FIG. 2 provides a schematic illustration of an architecture within which the multifunction instrument 100 may be used by an instrument holder 202. Interactions may be made with different devices within the architecture 200 depending on which aspect of the functionality is to be implemented at any particular. In certain instances, multiple functionalities may be implemented with a single interaction. Examples of such interactions are provided below.

Payment functionality is generally implemented through interactions with a merchant system 220. The drawing in FIG. 2 shows that such interactions may be made in a number of different ways. The most direct interaction is with a point-of-sale device 210 disposed at a point of sale. Usually, such an interaction requires the presence of the instrument 100 at the point of sale, with the point-of-sale device being operated directly by the customer as a self-service device or by a clerk employed by a merchant or other party. In cases where the instrument 100 comprises an RFID chip 120, interaction with the point-of-sale device includes an exchange of electromagnetic signals between the RFID chip 120 and an RFID reader comprised by the point-of-sale device 210. In such embodiments, the identification number 108 associated with the instrument holder 202 can be obtained directly. Usually, an encryption scheme is used to protect the identification number 108 from discovery even if the exchange of electromagnetic signals is intercepted.

The drawing notes that other types of remote interactions may also take place, although some embodiments may require the physical presence of the instrument 100 to support payment transactions. Example of such remote interactions include exchanges made over a public network like the Internet 208, exchanges made over a telephone system like the public-telephone switched network, or exchanges made over a coaxial system. Exchanges made over the Internet 208 are coordinated through a computational device 209, with the instrument holder 202 providing the identification number 108 through a computer interface. Exchanges made over the public-telephone switched network may be made through a telephone interface 214 that is provided in communication with a telephone 212 accessible to the instrument holder 202. With such an arrangement, the identification number 108 could be provided by the instrument holder keying the number on a telephone keypad to generate dual-tone multiple-frequency ("DTMF") tones that are transmitted to the merchant system 220 through the telephone interface 214. Alternatively, the instrument holder 202 could read the identification number 108 to a clerk employed on behalf of the merchant, with the clerk keying the number at the merchant end to provide the information to the merchant system 220. A cable interface 206 coupled with a cable-ready device 204 that the instrument holder 202 interacts with may provide similar functionality. It is noted that security protocols are less secure with these various remote forms of interaction than may be achieved with direct interaction with the RFID chip 120 of the instrument 100. There are, accordingly, embodiments in which such remote interactions are prevented by omitting any legible indication of the identification number 108 on the instrument 100; the identification number 108 in such embodiments may even be concealed from the instrument holder 202, who is then required to present the instrument 100 at an appropriate reader to initiate any functionality.

The merchant system 220 is provided with access to a merchant database 222 that it accesses in implementing payment functionalities. The merchant database 222 includes information that permits the merchant system 220 to identify a financial account to be used in supporting the transaction from the identification number 108. Since the identification number 108 may be associated with the instrument holder 202 as an individual, it may be associated in the merchant database 222 with multiple financial accounts, e.g., with a checking account, with a savings account, with a stored-value account, with a credit account, and the like. The interaction between the merchant system 220 and the instrument holder 202 may thus include a mechanism for determining which of the multiple accounts to use in supporting the transaction. For instance, the interaction may include a query listing the different accounts that are available and soliciting a response from the instrument holder 202. In some instances, the nature of the transaction itself may be such that only one of multiple accounts is appropriately applied to the transaction; in such cases, additional interactions with the instrument holder 202 to identify the particular account may be avoided.

The merchant system 220 is also provided in communication with one or more financial-institution systems 216 through a financial network 218. It is generally anticipated that the financial network 218 will comprise a private network that implements sophisticated encryption protocols to protect the security of communications exchanged through the network 218 that contain sensitive financial data. Each of the financial-institution systems 216 is controlled by a financial institution and is configured to communicate with the merchant system 220 in approving or denying potential transactions, as well as in initiating transfers of funds among different accounts in executing financial transactions.

Access-control functionality is generally implemented through an access interface 230 disposed at an entry to a restricted area. The access interface 230 may include electronic and/or mechanical mechanisms that are used to control access to the area, such as by controlling a lock on a door, controlling the ability to operate an elevator, controlling the ability to proceed through a turnstile, or controlling any other physical mechanism that may be used to prevent or allow access to an area. The access interface 230 is in communication with an access system 226 that makes the determination whether to grant or deny access in response to any particular request. Such requests generally take the form of an electronic packet that includes an identification number 108 associated with an instrument holder, and perhaps also a specification of the location to be accessed in embodiments where the access system 226 manages requests for a plurality of different locations. The identification number 108 included in the electronic packet is generally obtained by direct reading of the instrument 100, such as through an exchange of electromagnetic signals between the access interface 230 and an RFID chip 120 comprised by the instrument 100. While it is also possible in implementing the access-control functions to permit access without the physical presence of the instrument 100, this is expected to be uncommon. In those embodiments where it is permitted, a keypad or similar device could be provided a restricted-area entry, with the instrument holder 202 given the opportunity to enter the identification number 108 on the keypad.

The access system 226 is provided in communication with an access database 228 that includes information relevant to determinations whether to grant access in response to a request. For instance, the access database 228 may include information that provides a list of identification numbers 108 associated with individuals permitted access to each of one or more areas handled by the access system 226. With such information, the access system 226 parses a request to extract the identification number of the instrument holder 202 requesting access and perhaps also an identifier for the location to be accessed. A check is made with the database information to determine whether the identification number 108 and location are associated in the list of valid accesses.

In some embodiments, the access information stored in the access database 228 includes time-period information. This information specifies a time when a person having a particular identification number is permitted to have access to the restricted area. This provides a mechanism for distinguishing among a variety of different access situations: there are circumstances where a person might always be permitted access to an area; circumstances where a person might be permitted only one-time access during a defined period of time; and circumstances where a person might be permitted access on a recurring basis, such as during certain times of every day or certain days of every week. In order to gain access, the identification number 108 would not only need to be included in the database 228, but would also need to be associated with the time at which the instrument holder 202 presents himself for entry into the restricted area.

Each of the merchant system 220 and access system 226 is provided in communication with a security system 240 through a security network 224. The drawing includes additional lines emanating from the security network 224 to emphasize that the details provided for only a single merchant system 220 and a single access system 226 are merely illustrative. More generally, the security network 224 is interfaced with a plurality of merchant systems 220 and a plurality of access systems 226. As explained further below, the security system 240 may receive detailed information on each payment function and each access function that are executed so that significantly more useful information may be collected when the architecture includes multiple merchant systems 220 and access systems 226.

The security system 240 has access to a security database 242 that stores a variety of different types of information that may be relevant to security analyses. Some of this information includes information received through the security network 224 from merchant systems 220 and access systems 226. Those systems may transmit details of attempted payment transactions, both approved transactions and denied transactions, so that the security system 240 may monitor financial activities of individuals. In addition, those systems may transmit details of attempted access transactions, both where access is granted and where access is denied, so that the security system 240 may monitor certain aspects of the movements of individuals.

Collection of data by the security system 240 related to unsuccessful attempts may sometimes be at least as informative as successful attempts. This is true both in the case of financial transactions and in the case of access transactions, particularly when there are repeated attempts to execute certain types of financial transactions or to gain access to certain restricted areas. In certain instances, it is the combination of an attempted financial transaction and an attempted access transaction that is most informative as to the underlying objective of the individual. The most informative kinds of data may sometimes take the form of deviations from established patterns of activity of individuals. For instance, it is almost always the case that the types of financial transactions executed by a given individual and the restricted places that are accessed by the individual show systematic trends over weekly, monthly, and yearly time periods. Attempts by an individual to execute financial transactions outside these normal patterns and/or to attempts to access restricted areas that he has previously had no need to access provide an indication that there may be more general changes in the behavior of the individual.

The security database 242 may also include information from a variety of different other sources that are intended to provided direct information related to specific kinds of security concerns. For example, government intelligence agencies may have systems 248 that are in communication with the security system 240 through an intelligence network 244. The intelligence network 244 is generally a highly secure network that uses sufficiency strong encryption protocols to accommodate the sensitive nature of information obtained from intelligence agencies. This type of information may include the results of a variety of different surveillance techniques, such as monitoring of telephone and email communications, and monitoring of physical sites, as well as include data provided by cooperations with other intelligence agencies.

Other types of sources that may provide information to the security system 240 may include a variety of infrastructure entities, such as those responsible for power generation, distribution of water supplies, and the like. These systems 252 and 254 may provide information to the security system 240 over corresponding infrastructure networks 246 in a number of different forms. For example, in some instances, periodic updates may be provided concerning the status of the relevant infrastructure components, including the status of security features at important infrastructure locations. In other instances, real-time status information may be provided in the form of levels of power being distributed to different communities, in the form of levels of water being distributed by different water-distribution systems, and the like.

Collection of these various types of information by the security system 240 in addition to the payment-transaction information and access-transaction information provided by the merchant systems 220 and the access systems 226 defines a comprehensive body of information that may be used for security applications. One fundamental purpose of the security system 240 is thus to apply data-analysis techniques to identify potentially suspicious activity of individuals from this body of data and to initiate responses to those suspicions when appropriate, i.e. when the risk level has risen above a certain threshold level.

Responses may be initiated by providing alerts to different types of responders, examples of which include military responders 236, police responders 234, and medical responders 232 in different embodiments. Such alerts may be provided over a response network to a military system 236, a police system 234, and/or a medical system 232 as appropriate. These systems, in turn, may be configured to notify the appropriate personnel, who will determine what type of action to take in response to the alert.

Figure 3:
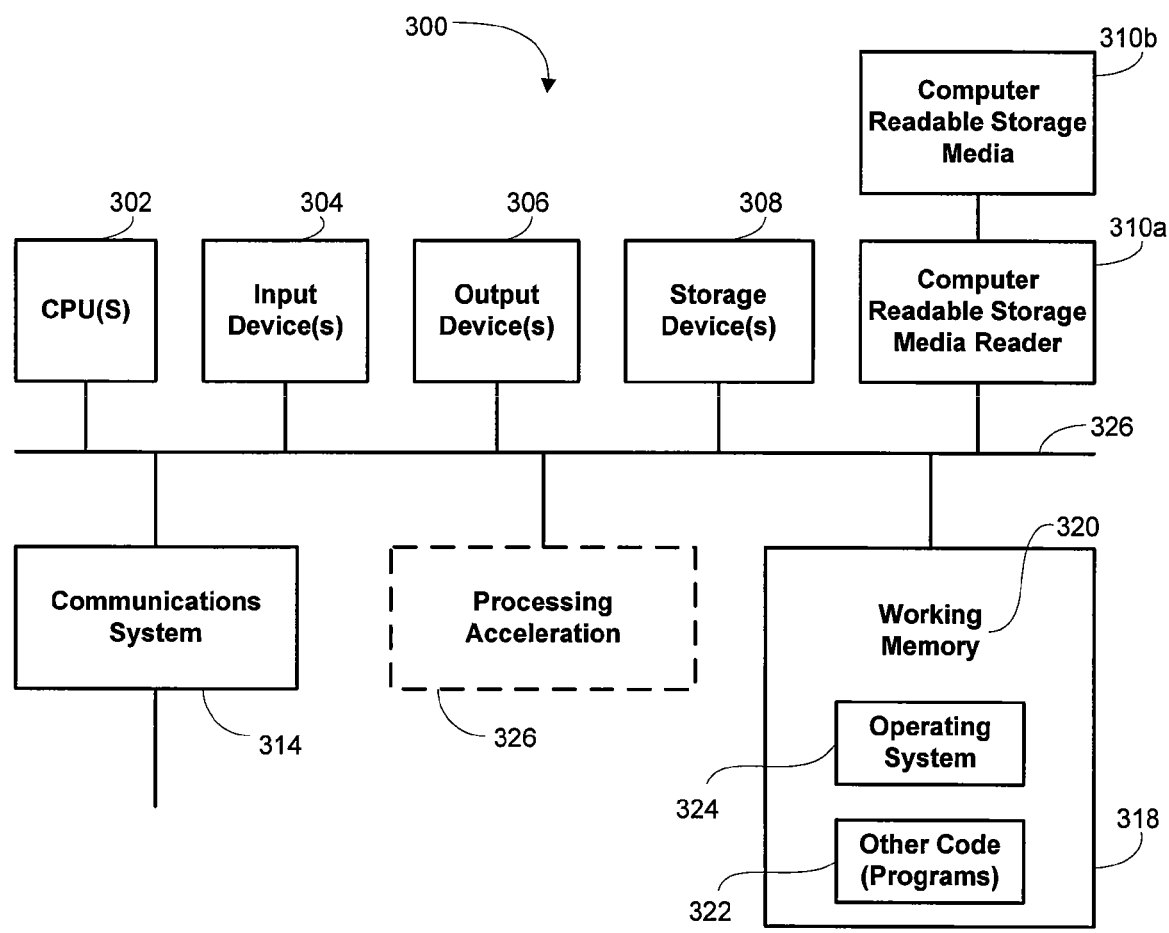
FIG. 3 is a schematic diagram of a computational device on which methods of the invention may be embodied.

Each of the various systems shown in FIG. 2 may be provided in the form of a computational device that has programming instructions that define its operation within the architecture 200. FIG. 3 provides a schematic illustration of a structure that may be used to implement such computational devices. In FIG. 3, the computational device is indicated generically by reference number 300, but it should be understood that this drawing shows a structure that may be used for the merchant system 220, the access system 226, the security system 240, the intelligence-agency systems 248, the power-supplier systems 252, the water-distributor systems 254, the medical system 232, the police system 234, and/or the military system 236, in addition to other systems that may be integrated within the architecture in different embodiments.

FIG. 3 broadly illustrates how individual system elements may be implemented in a separated or more integrated manner. The computational device 300 is shown comprised of hardware elements that are electrically coupled via bus 326, including a processor 302, an input device 304, an output device 306, a storage device 308, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged over the architecture described in connection with FIG. 2.

The computational device 300 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 4A:
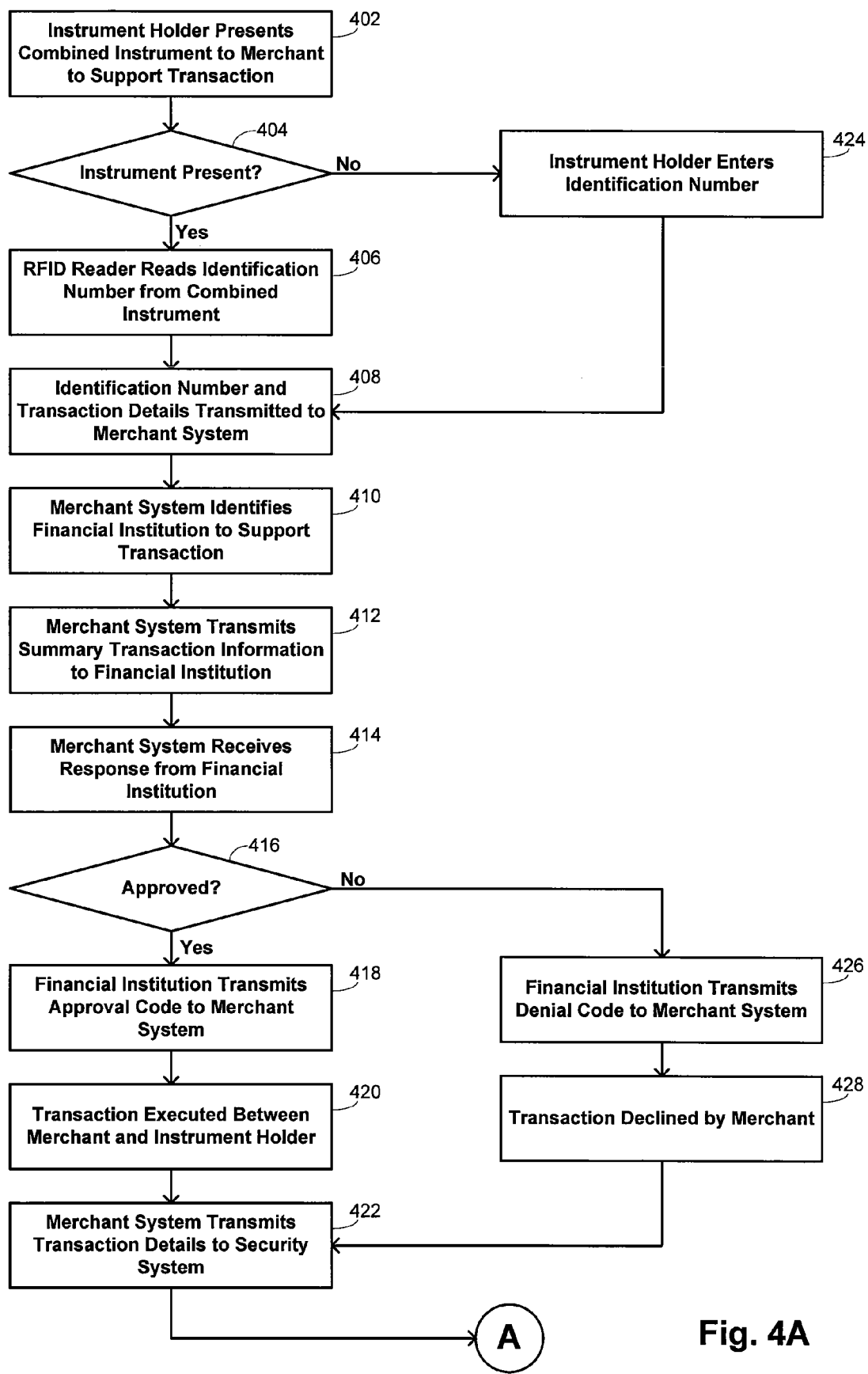
FIGS. 4A-4C are flow diagrams summarizing methods of the invention in various embodiments.
Figure 4B:
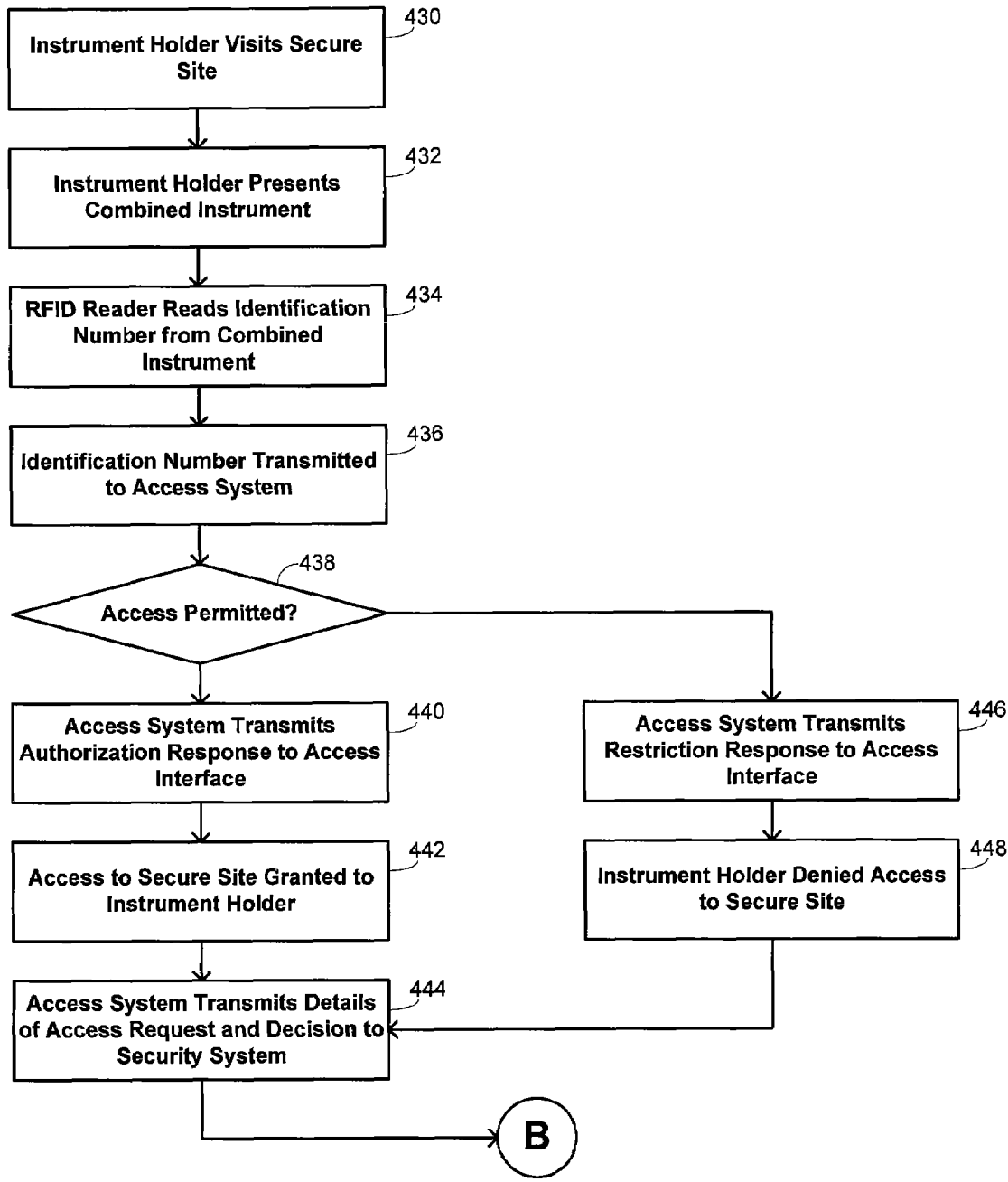
Figure 4C:
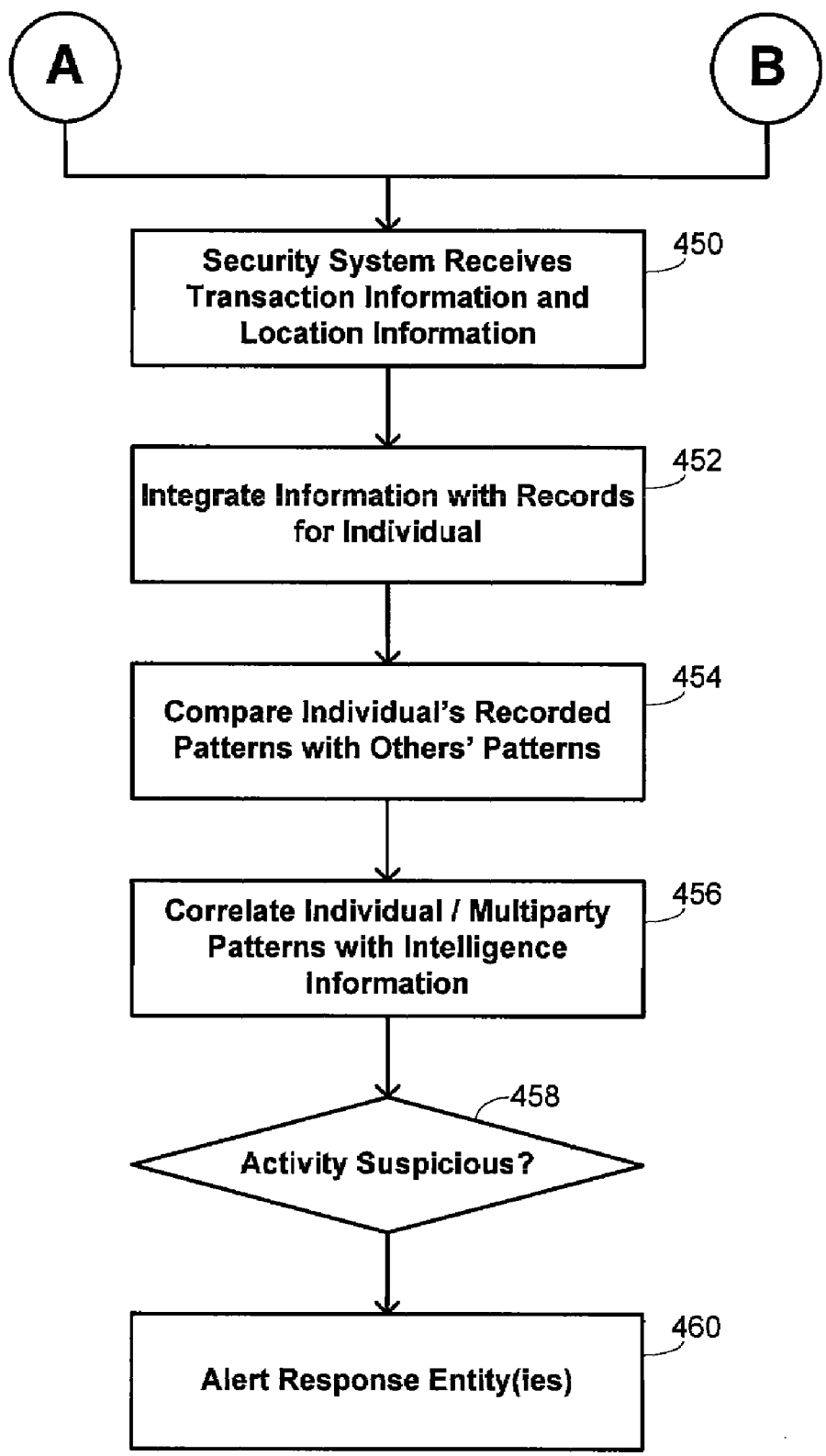

An overview of methods of the invention that may be implemented within the architecture illustrated in FIG. 2 are provided with the flow diagrams of FIGS. 4A-4C. Briefly, these methods provide a mechanism for collecting financial-transaction and access-transaction data for an individual who uses the combined payment and access-control instrument and for using that data to perform security-monitoring functions. FIG. 4A generally illustrates the collection of financial-transaction data during an attempted financial transaction using the multifunction instrument. FIG. 4B generally illustrates the collection of access-transaction data during an attempted access transaction using the multifunction instrument. And FIG. 4C generally illustrates how this information may be combined and perhaps correlated with other types of information in executing the security-monitoring functions.

To begin execution of a financial transaction with a merchant, the instrument holder 202 presents the combined instrument 100 to the merchant to support the transaction at block 402 of FIG. 4A. As previously noted, the different mechanisms for interaction between the instrument holder 202 and the merchant system 220 permit the instrument 100 to be physically present at the merchant location or to be effected remotely. In either case, the identification number 108 is determined for transmission to the merchant system 220 with other transaction information. If the instrument is physically present, as checked at block 404, an RFID reader may be used to read the identification number 108 from the instrument 100 at block 406. If the instrument 100 is not present, the instrument holder 202 may be prompted to enter the identification number 108 at block 424 using one of the interfaces described in connection with FIG. 2 above. Once the identification number 108 is determined, it is combined with details of the proposed transaction for transmission to the merchant system 220 at block 408.

The transaction details may vary in the degree of their specificity in different embodiments. For example, in some embodiments, item-level information is included in the transmission to the merchant system. Such item-level information includes detailed information that identifies every individual goods or services item selected by the instrument holder 202 for purchase, and the price of each such item. In other embodiments, the transmission might include only higher-level information indicating a department of the merchant from which the items were selected or might even only provide the total cost of the transaction to the instrument holder 202. Those embodiments in which detailed item-level information is included provide better information for the security applications described below in connection with FIG. 4C.

At block 410, after receiving the transmission specifying transaction details, the merchant system 220 extracts the identification number 108 from the transmission packet and uses it to determine which financial institution is to be contacted for approval in executing the transaction. This determination is made using the data stored in the merchant database 222 as described above, and may be made in a similar fashion for any type of financial transaction, including credit, debit, and stored-value transactions.

The merchant system 220 thus generates a communication to be transmitted to the identified financial-institution system 216 at block 412. This communication generally includes only that information needed by the financial institution to determine whether to approve the allocation of funds from the identified account. That is, summary transaction information specifying the total cost of the transaction is generally sufficient for credit and debit transactions. In the case of stored-value transactions, the summary transaction information may sometimes include addition detail depending on the types of restrictions that may be associated with use of the stored-value account. The merchant system 220 receives a response to the communication at block 414 indicating whether application of funds from the identified account is permitted. This kind of determination reflects whether the size of the transaction is consistent with the balance or credit limit of the account, and whether the type of transaction is consistent with any restrictions that may be applied to use of the account.

The merchant system 220 takes action consistent with the nature of the response from the financial-institution system 216. Thus, if the financial institution approves the transaction, as checked at block 416, it transmits an approval code to the merchant system at block 418 and the transaction is executed between the merchant and instrument holder at block 420. If, instead, the financial institution refuses the transaction, it transmits a denial code to the merchant system 220 at block 426, causing the transaction to be declined at block 428.

Irrespective of whether the transaction is executed or declined, the merchant system 220 may transmit details of the transaction to the security system 240 at block 442. Generally, these transaction details include as much information as was collected by the merchant system 220, specifying item-level information when it is available. In other embodiments, a summary of the transaction information may be transmitted, but the ability of the security system 240 to identify suspicious activity is enhanced with the more detailed information.

Execution of access transactions is performed in a similar fashion. An access transaction begins at block 430 of FIG. 4B with the instrument holder 202 visiting a secure site. The instrument holder 202 presents the instrument 100 at block 432, permitting an RFID reader to extract the identification number 108 from the instrument 100 at block 434. The identification number 108 is transmitted to the access system 226 at block 436. Information stored in the access database 228 permits the access system 226 to determine whether to grant access to the restricted area to the person identified by the identification number 108.

If access is to be permitted, as checked at block 438, the access system 226 transmits an authorization response to the access interface at block 230, causing the access interface 230 to grant access to the instrument holder at block 442. Access is granted by the access interface 230 using its mechanical and/or electronic machinery to control physical devices that would otherwise prevent entry into the controlled area. If access is instead to be denied, because there is no record in the access database 228 that the person with the identification number 108 is permitted in that area, the access system 226 will transmit a restriction response to the access interface 230 at block 448. The access interface 230 will then use its mechanical and/or electronic machinery to prevent access with physical devices disposed to do so.

In either case, the access system 226 transmits details of the access request and the resulting decision to the security system 240 at block 444. Such details generally include an identification of the area to which access was requested, the identification number of the individual who requested access, and whether access was granted.

In some instances, the access system 226 and the merchant system 220 may cooperate in executing combined payment and access transactions. Such combined transactions find particular utility in environments where access to a restricted area is conditioned on payment by a customer. For example, access to cinemas, sporting arenas and stadiums, art galleries, museums, amusement parks, and the like are usually provided only upon payment of a fee by a customer. In such environments, the instrument holder 202 could tender the combined instrument 100 for payment at a box office or similar payment facility. Instead of being issued an entry ticket, the merchant system 220 would then communicate an entry authorization to the access system 226. When the instrument holder 202 presented herself at the access interface 230 to gain entry to the facility, the combined instrument 100 could be presented and read by the access interface 230, avoiding the need to have personnel disposed at the entry to check for valid entry tickets.

Such a mechanism also provides a convenient method of controlling access time periods. For example, a purchase associated with a sporting event might be associated with a particular one of several games to be played at a particular location. By transmitting time information from the merchant system 220 to the access system 226, control may be exercised that prevents the instrument holder 202 from gaining access to on the wrong day. In another application, entry rights to amusement or theme parks may sometimes be made for different stretches of time, with single-day rights, multi-day rights, weekly rights, or the like being sold. Again, transmission of the appropriate time information from the merchant system 220 at the time of purchasing the rights using the combined instrument 100 to the access system 226 provides an effective way of ensuring compliance with the time periods purchased.

To execute security functions with the architecture 200 shown in FIG. 2, the information transmitted by the merchant system 220 and the access system 226 respectively at block 422 of FIG. 4B and at block 444 of FIG. 4C is received by the security system 240 at block 450 of FIG. 4C. Information from a single payment or access transaction is unlikely by itself to raise any security issues. But when the information from each transaction is integrated with other records for a particular individual at block 452, patterns may become apparent that do cause suspicion or raise other security issues. This integration can be an important component of the security analysis. As progressively more payment and access transaction information is collected, initially cautious designations of suspicious activity may be reinforced by the clear establishment of a suspicious pattern. Alternatively, further information may act to destroy such preliminary designations by clarifying a nonsuspicious purpose to the activities.

The types of patterns that are evident of suspicious activity are highly variant. In some embodiments, the security system 240 comprises learning software that permits it to make more accurate assessments of activity in discriminating between suspicious and nonsuspicious activities. For example, in some embodiments, the security system 240 comprises a neural network that has been trained to categorize activity patterns as suspicious or nonsuspicious. As will be known to those of skill in the art, a neural network is an arrangement that comprises a plurality of interconnected nodes that define how a given output, i.e. "suspicious" or "nonsuspicious," is related to conditions defined by a layer of input nodes. As the security system 240 makes determinations that are subsequently verified or disproved, the neural network is reorganized to generate the correct prediction. As such reorganizations take place over time, the system 240 becomes systematically more accurate in making suspiciousness predictions. In some instances, the neural network may be configured to apply fuzzy logic, which is a system of logic that permits intermediate logic states between conventional Boolean "true" and "false" states. The implementation of fuzzy logic in this kind of system may provide the system with greater sensitivity in discriminating patterns that might otherwise have both suspicious or benign overtones. Other types of intelligence software that may be implemented with the security system 240 in alternative embodiments include the use of expert systems, the use of genetic algorithms, the use of simulated-annealing algorithms, and the like, all of which are well known to those of skill in the art.

In addition to there being patterns developed by the activities of single individual that may indicate activity that is suspicious, there are also more sophisticated patterns that may require information from multiple individuals for the suspicious nature of the activity to become apparent. In such cases, the activity of each individual in isolation is nonsuspicious. But because of collaboration among multiple individuals, there is a suspicious nature to their activities when its coordinated nature is understood. Accordingly, as indicated at block 454, the security system 240 may be configured to perform comparisons of individual recorded patterns with the patterns of others to identify such coordinate behaviors.

It is also the case that the interpretation of certain patterns of activities may depend on the availability of other types of information. Block 456 of FIG. 4C indicates that correlations may be checked between individual or multiparty patterns with intelligence or similar information. Such a check recognizes that activity that is considered benign under normal circumstances may be considered suspicious when it exists in the context of specific information that may have been uncovered by other mechanisms.

All of this information is continually collected by the security system as payment and access transactions are executed by a number of different individuals who interact with the architecture 200 shown in FIG. 2. When activity is identified as suspicious, as checked at block 458, an alert is transmitted to a response entity at block 460. The system may naturally be tailored to quantify the level of risk associated with identification of an activity as suspicious. This permits a threshold level to be established before the system produces a positive designation of suspiciousness. In this way, overwhelming of the system with very minor issues is prevented so that the rate at which alerts are generated is consistent with the capacity of the response entities to address them. If this rate changes over time, so that too many alerts are being issued and preventing meaningful action by the response entities or so that too few alerts are being issued and genuinely suspicious activities are being ignored, the quantitative threshold may easily be adjusted.

The architecture illustrated in FIG. 2 and the corresponding methods described in connection with FIGS. 4A-4C have considerable flexibility in the types of applications that may be accommodated. While the above description has provided a number of illustrative examples of applications that the systems and methods may implement, this has necessarily been an incomplete inventorying of potential applications. Numerous alternative applications will readily occur those of skill in the art after reading this description.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of monitoring behavior of a holder of a multifunction presentation instrument suitable for presentation by the holder in support of payment transactions and access transactions, wherein a payment transaction comprises a purchase by the holder using funds identified by the multifunction presentation instrument and an access transaction comprises an authorization for the holder to enter a restricted area, the method comprising;
   receiving a first communication at a host system, the first communication comprising transaction details of an attempted payment transaction initiated by the holder;
   receiving a second communication at the host system, the second communication comprising transaction details of an attempted access transaction initiated by the holder;
   storing the transaction details of the attempted payment transaction and the transaction details of the attempted access transaction in a data store; and
   performing an analysis of data comprising the transaction details of the attempted payment transaction and the transaction details of the attempted access transaction to identify potentially suspicious behavior by the holder;
   wherein performing the analysis of the data comprises:
   retrieving transaction details of other past payment transactions attempted by the holder from the data store; and
   correlating the details of the attempted payment transaction, the attempted access transaction, and the other past payment transactions with information received from one or more intelligence agencies or with information received from one or more infrastructure entities responsible for power generation or water supply distribution, to identity a pattern that indicates potentially suspicious behavior by the holder.

2. The method recited in claim 1 wherein the first communication includes an indication that the attempted payment transaction was executed by providing funds to support a purchase by the holder.

3. The method recited in claim 1 wherein the first communication includes an indication that the attempted payment transaction was denied.

4. The method recited in claim 1 wherein the second communication includes an indication that the attempted access transaction was authorized by granting authorization to the holder to enter a restricted area.

5. The method recited in claim 1 wherein the second communication includes an indication that the attempted access transaction was denied.

6. The method recited in claim 1 wherein:
   the attempted payment transaction comprises a purchase by the holder for access to a particular restricted area; and
   the attempted access transaction comprises an authorization for the holder to enter the particular restricted area.

7. The method recited in claim 1 further comprising receiving a third communication at the host system, the third communication comprising transaction details of a second attempted payment transaction initiated by the holder, wherein:
   the first communication specifies a type of the attempted payment transaction;
   the third communication specifies a second type of the second attempted payment transaction different from the type of the attempted payment transaction; and
   the type of the attempted payment transaction and the second type of the second attempted payment transaction are each selected from the group consisting of a credit transaction, a debit transaction, and a stored-value transaction.

8. The method recited in claim 1 wherein performing the analysis of the data comprises:
   receiving nontransaction information; and analyzing the transaction details of the attempted payment transaction and attempted access transaction in combination with the nontransaction information to identify the potentially suspicious behavior by the holder.

9. The method recited in claim 1 further comprising initiating a response to the potentially suspicious behavior by the holder.

10. The method recited in claim 1 wherein:
the funds identified by the multifunction presentation instrument are maintained in an account by a financial institution; and
the attempted payment transaction comprises a request for approval of the attempted payment transaction from the financial institution.

11. The method recited in claim 10 wherein the attempted payment transaction is initiated by the holder through an exchange of radio-frequency electromagnetic signals with the multifunction presentation instrument.

12. The method recited in claim 1 wherein the attempted access transaction is initiated by the holder through an exchange of radio-frequency electromagnetic signals with the multifunction presentation instrument.

13. The method recited in claim 1 wherein:
the transaction details of the attempted payment transaction comprise an identification number unique to the holder; and
the transaction details of the attempted access transaction comprise the identification number.

14. The method recited in claim 1, wherein the attempted access transaction comprises attempted access to a particular restricted area, and wherein the attempted payment transaction does not comprise a purchase by the holder for access to the particular restricted area.

15. A method of monitoring behavior of a holder of a multifunction presentation instrument suitable for presentation by the holder in support of payment transactions and access transactions, wherein a payment transaction comprises a purchase by the holder using funds identified by the multifunction presentation instrument and an access transaction comprises an authorization for the holder to enter a restricted area, the method comprising:
receiving a first communication at a host system, the first communication comprising transaction details of an attempted payment transaction initiated by the holder;
receiving a second communication at the host system, the second communication comprising transaction details of an attempted access transaction initiated by the holder;
storing the transaction details of the attempted payment transaction and the transaction details of the attempted access transaction in a data store;
retrieving transaction details of payment transactions attempted by a second holder of a second multifunction presentation instrument from the data store, wherein the second holder is different from the holder and the second multifunction presentation instrument is different from the multifunction presentation instrument; and
correlating the details of the attempted payment transaction, the attempted access transaction, and the payment transactions attempted by the second holder of the second multifunction presentation instrument with information received from one or more intelligence agencies or with information received from one or more infrastructure entities responsible for power generation or water supply distribution, to identify the potentially suspicious behavior by the holder.

16. A method of monitoring behavior of a holder of a multifunction presentation instrument suitable for presentation by the holder in support of payment transactions and access transactions, wherein a payment transaction comprises a purchase by the holder using funds identified by the multifunction presentation instrument and an access transaction comprises an authorization for the holder to enter a restricted area, the method comprising:
receiving payment-transaction information for an attempted payment transaction and an identification number unique to the holder at a merchant system;
identifying a financial institution using the identification number;
transmitting a request for approval of the attempted payment transaction from the merchant system to the financial institution;
receiving a response to the request from the financial institution at the merchant system;
determining whether to approve the attempted payment transaction from the response with the merchant system;
generating a first communication at the merchant system, the first communication comprising at least a portion of the payment-transaction information and an indication whether the attempted payment transaction was approved;
transmitting the first communication from the merchant system to a host system;
receiving access-transaction information for an attempted access transaction and the identification number at an access system;
determining whether to authorize the attempted access transaction by granting access to a restricted area from the access-transaction information and the identification number with the access system;
generating a second communication at the access system, the second communication comprising at least a portion of the access-transaction information and an indication whether the attempted access transaction was authorized;
transmitting the second communication from the access system to the host system; and
performing an analysis of data comprising the at least a portion of the payment-transaction information and the at least a portion of the access-transaction information with the host system to identify potentially suspicious behavior by the holder;
wherein performing the analysis of the data comprises:
retrieving transaction details of past payment transactions attempted by the holder from a data store; and
correlating the details of the attempted payment transaction, the attempted access transaction, and the past payment transactions with information received from one or more intelligence agencies or with information received from one or more infrastructure entities responsible for power generation or water supply distribution, to identify a pattern that indicates potentially suspicious behavior by the holder.

17. The method recited in claim 16 wherein:
the attempted payment transaction comprises a purchase by the holder for access to a particular restricted area; and
the attempted access transaction comprises an authorization for the holder to enter the particular restricted area.

18. The method recited in claim 16 wherein the attempted payment transaction is initiated by the holder through an exchange of radio-frequency electromagnetic signals with the multifunction presentation instrument.

19. The method recited in claim 16 wherein the attempted access transaction is initiated by the holder through an exchange of radio-frequency electromagnetic signals with the multifunction instrument.

20. The method recited in claim 16, wherein the attempted access transaction comprises attempted access to a particular restricted area, and wherein the attempted payment transaction does not comprise a purchase by the holder for access to the particular restricted area.

21. A system for monitoring behavior of a holder of a multifunction presentation instrument suitable for presentation by the holder in support of payment transactions and access transactions, wherein a payment transaction comprises a purchase by the holder using funds identified by the multifunction instrument and an access transition comprises an authorization for the holder to enter a restricted area, the system comprising:
    a communications device;
    a processor;
    a storage device; and
    a memory coupled with the processor, the memory comprising a computer-readable storage medium having a computer-readable program embodied therein for directing operation of the processing system to monitor behavior of the holder, the computer-readable program including:
        instructions for receiving, with the communications device, a first communication comprising transaction details of an attempted payment transaction initiated by the holder;
        instructions for receiving, with the communications device, a second communication comprising transaction detail of an attempted access transaction initiated by the holder;
        instructions for storing the transaction details of the attempted payment transaction and the transaction details of the attempted access transaction on the storage device; and
        instructions for performing, with the processor, an analysis of data comprising the transaction details of the attempted payment transaction and the transaction details of the attempted access transaction to identify potentially suspicious behavior of the holder;
    wherein performing the analysis of the data comprises:
    retrieving transaction details of past payment transactions attempted by the holder from the storage device; and
    correlating the details of the attempted payment transaction, the attempted access transaction, and the other past payment transactions with information received from one or more intelligence agencies or with information received from one or more infrastructure entities responsible for power generation or water supply distribution, to identify a pattern that indicates potentially suspicious behavior by the holder.

22. The system recited in claim 21 further comprising:
    a merchant system in communication with the communications device, the merchant system having instructions for processing the attempted payment transaction; and
    an access system in communication with the communications device, the access system having instructions for processing the attempted access transaction.

23. The system recited in claim 22 wherein the instructions for processing the attempted payment transaction comprise instructions for requesting approval of the attempted payment transaction from a financial institution identified by the multifunction instrument.

24. The system recited in claim 22 further comprising a point-of-sale device in communication with the merchant system, the point-of-sale device including a radio-frequency transceiver adapted to exchange radio-frequency electromagnetic signals with the multifunction instrument.

25. The system recited in claim 22 further comprising an access interface in communication with the access system, the access device including a radio-frequency transceiver adapted to exchange radio-frequency electromagnetic signals with the multifunction instrument.

26. The system recited in claim 21 wherein:
    the attempted payment transaction comprises a purchase by the holder for access to a particular restricted area; and
    the attempted access transaction comprises an authorization for the holder to enter the particular restricted area.

27. The system recited in claim 21 wherein:
    the computer-readable program further includes instructions for receiving, with the communications device, a third communication comprising transaction details of a second attempted payment transaction initiated by the holder;
    the first communication specifies a type of the attempted payment transaction;
    the third communication specifies a second type of the second attempted payment transaction; and
    the type of the attempted payment transaction and the second type of the second attempted payment transaction are each selected from the group consisting of a credit transaction, a debit transaction, and a stored-value transaction.

28. The system recited in claim 21 wherein the instructions for performing the analysis of the data comprise:
    instructions for receiving nontransaction information; and
    instructions for analyzing the transaction details of the attempted payment transaction and attempted access transaction in combination with the nontransaction information to identify the potentially suspicious behavior by the holder.

29. The system recited in claim 21 wherein the computer-readable program further includes instructions for initiating a response to the potentially suspicious behavior by the holder.

30. The system recited in claim 21 the transaction details of the attempted payment transaction comprise an identification number unique to the holder; and
    the transaction details of the attempted access transaction comprise the identification number.

31. The system recited in claim 21, wherein the attempted access transaction comprises attempted access to a particular restricted area, and wherein the attempted payment transaction does not comprise a purchase by the holder for access to the particular restricted area.

32. A system for monitoring behavior of a holder of a multifunction presentation instrument suitable for presentation by the holder in support of payment transactions and access transactions, wherein a payment transaction comprises a purchase by the holder using funds identified by the multifunction instrument and an access transition comprises an authorization for the holder to enter a restricted area, the system comprising:
    a communications device;
    a processor;
    a storage device; and
    a memory coupled with the processor, the memory comprising a computer-readable storage medium having a computer-readable program embodied therein for directing operation of the processing system to monitor behavior of the holder, the computer-readable program including:

instructions for receiving, with the communications device, a first communication comprising transaction details of an attempted payment transaction initiated by the holder;

instructions for receiving, with the communications device, a second communication comprising transaction detail of an attempted access transaction initiated by the holder;

instructions for storing the transaction details of the attempted payment transaction and the transaction details of the attempted access transaction on the storage device; and instructions for performing, with the processor, an analysis of data comprising the transaction details of the attempted payment transaction and the transaction details of the attempted access transaction to identify potentially suspicious behavior of the holder;

instructions for retrieving transaction details of payment transactions attempted by a second holder of a second multifunction presentation instrument from the storage device, wherein the second holder is different from the holder and the second multifunction presentation instrument is different from the multifunction presentation instrument; and instructions for correlating the combined details of the attempted payment transaction, the attempted access transaction, and the payment transactions attempted by the second holder of the second multifunction presentation instrument with information received from one or more intelligence agencies or with information received from one or more infrastructure entities responsible for power generation or water supply distribution, to identify the potentially suspicious behavior by the holder.

* * * * *